(12) United States Patent
Tokashiki

(10) Patent No.: US 8,514,444 B2
(45) Date of Patent: Aug. 20, 2013

(54) IMAGE PROCESSING SYSTEM TO ADJUST IMAGE OUTPUT DATA

(75) Inventor: Kiyoshi Tokashiki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1098 days.

(21) Appl. No.: 12/421,429

(22) Filed: Apr. 9, 2009

(65) Prior Publication Data

US 2009/0257088 A1 Oct. 15, 2009

(30) Foreign Application Priority Data

Apr. 11, 2008 (JP) ................................. 2008-103216

(51) Int. Cl.
 *G06K 15/00* (2006.01)
 *B65H 5/22* (2006.01)
(52) U.S. Cl.
 USPC ........................................ 358/1.18; 271/3.15
(58) Field of Classification Search
 USPC ............................................... 358/1.15, 1.14
 See application file for complete search history.

(56) References Cited

U.S. PATENT DOCUMENTS

| 5,678,000 A | * | 10/1997 | Ohtani | 358/1.2 |
| 2001/0007619 A1 | * | 7/2001 | Kakutani | 400/582 |
| 2003/0133158 A1 | * | 7/2003 | Uchida | 358/1.18 |
| 2006/0056859 A1 | * | 3/2006 | Otani | 399/16 |

FOREIGN PATENT DOCUMENTS

| JP | 2002-337433 A | 11/2002 |
| JP | 2004-9713 A | 1/2004 |
| JP | 2007-194873 A | 8/2007 |

* cited by examiner

*Primary Examiner* — Benny Q Tieu
*Assistant Examiner* — Sunil Chacko
(74) *Attorney, Agent, or Firm* — Canon USA, Inc., I.P. Division

(57) ABSTRACT

According to an embodiment of the present invention, when image data is output from an image forming apparatus, even if the specified sheet feeding unit is changed, an image positional shift function can be utilized. In an image processing apparatus, a factor according to which readjustment may be provided is generated, such as switching of sheet feeding trays or rotation of an image. In this case, the image processing apparatus can transmit a readjustment request to an external controller. The external controller receiving the readjustment request from the image processing apparatus changes the adjustment value and carries out a RIP processing again. Then, the external controller can re-transmit the image data subjected to the RIP processing to the image processing apparatus.

15 Claims, 15 Drawing Sheets

FIG. 6
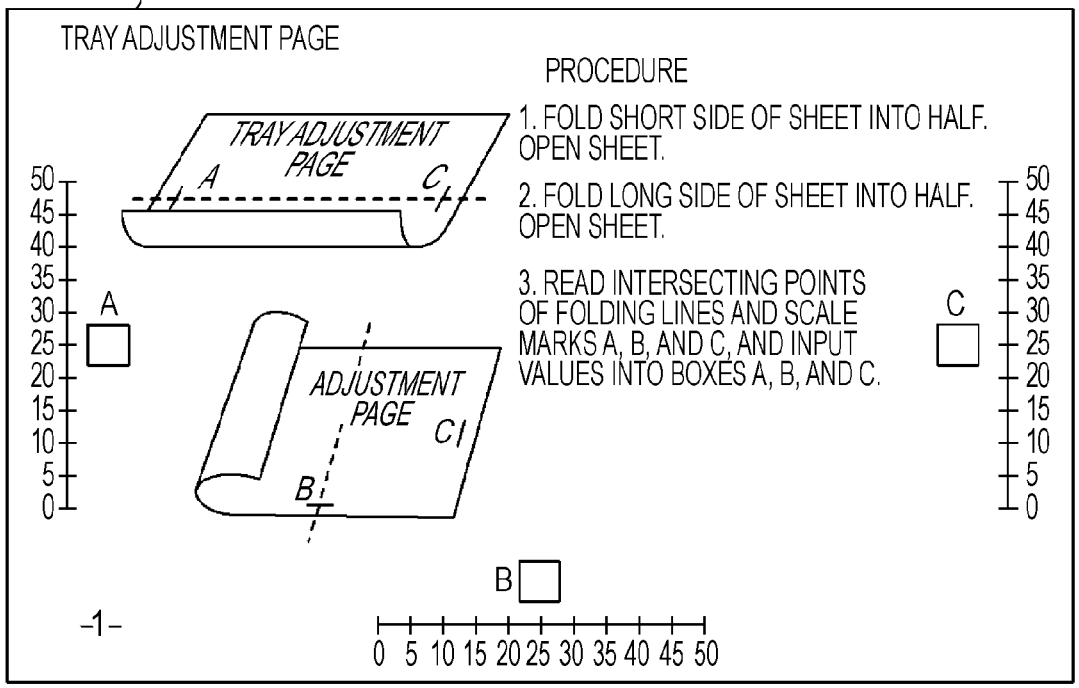
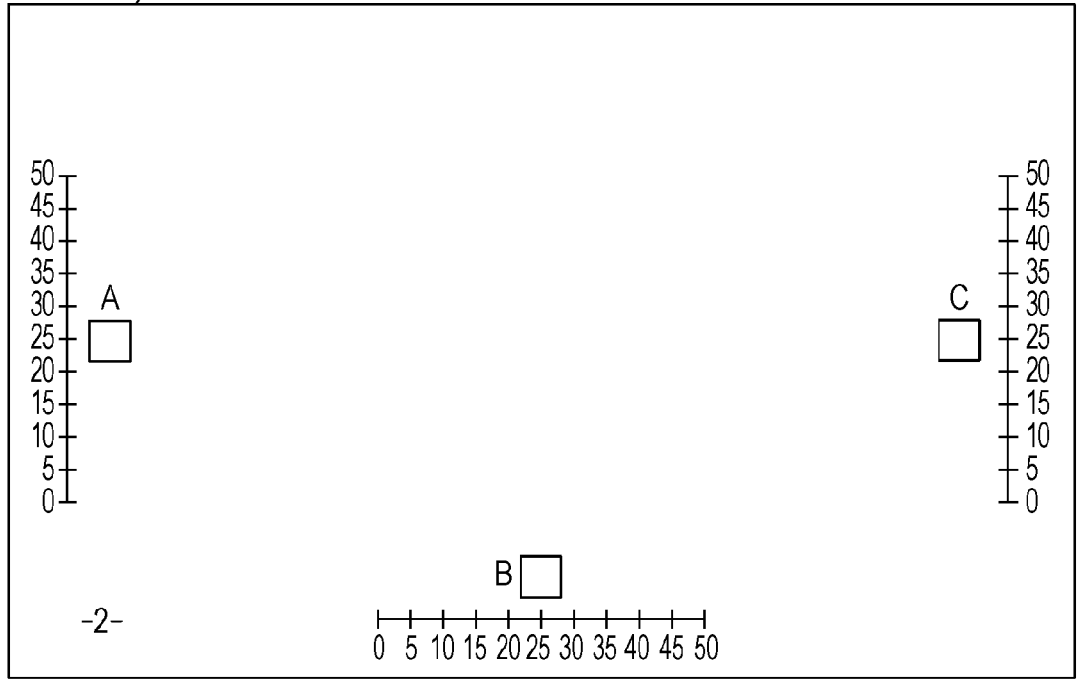

FIG. 8

| TRAY | ADJUSTMENT VALUES |
|---|---|
| MANUAL FEED | A = 25, B = 22, C = 10 |
| CASSETTE 1 | A = 25, B = 22, C = 24 |
| CASSETTE 2 | A = 22, B = 19, C = 20 |
| CASSETTE 3 | A = 25, B = 20, C = 25 |
| CASSETTE 4 | A = 29, B = 22, C = 10 |

AMTB

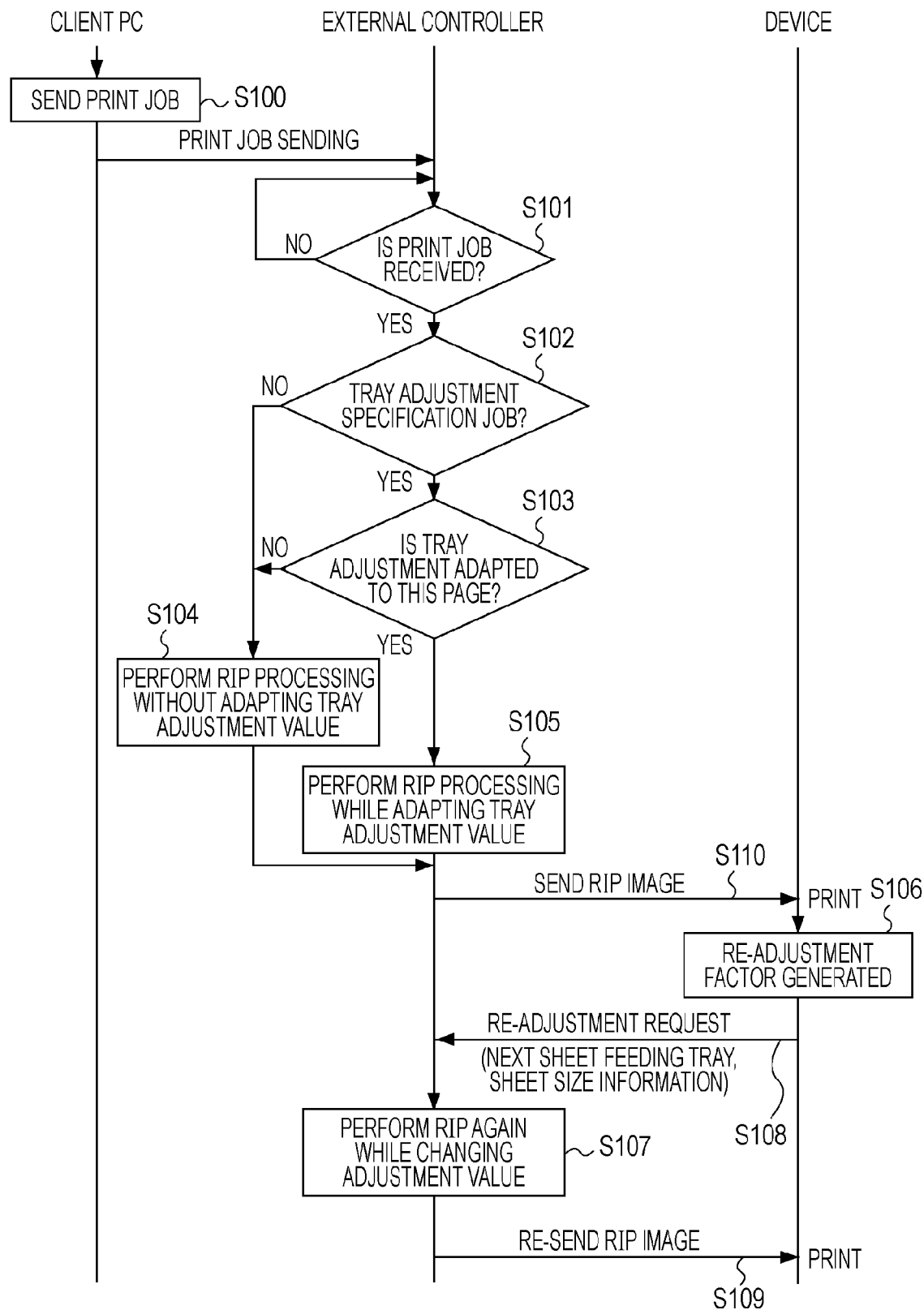

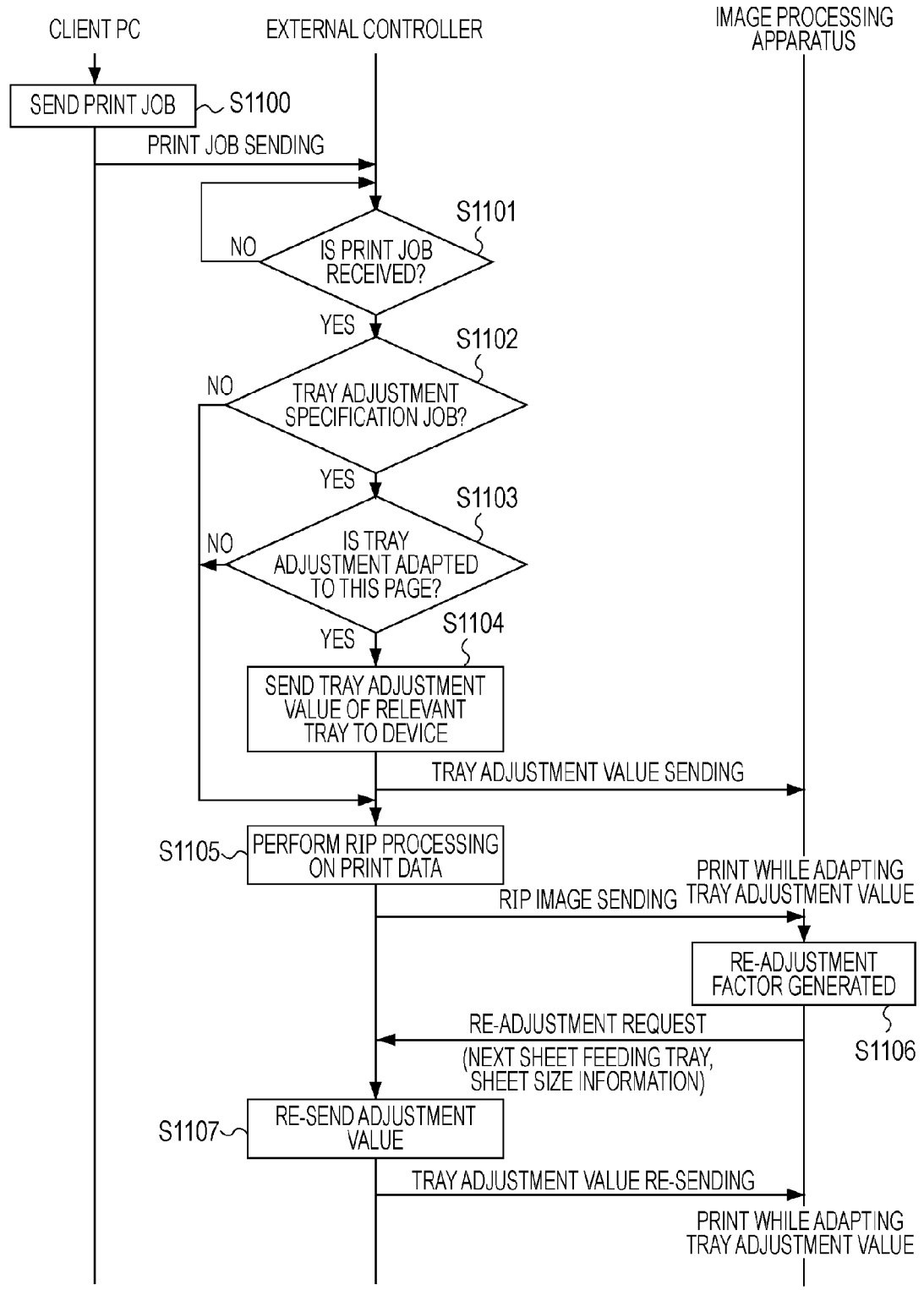

FIG. 14

STORAGE MEDIUM SUCH AS FD/CD-ROM

| DIRECTORY INFORMATION |
|---|
| FIRST PROCESSING PROGRAM<br>PROGRAM CODE GROUP CORRESPONDING TO STEPS OF FLOW CHART SHOWN IN FIG. 7 |
| SECOND PROCESSING PROGRAM<br>PROGRAM CODE GROUP CORRESPONDING TO STEPS OF FLOW CHART SHOWN IN FIG. 9 |
| THIRD PROCESSING PROGRAM<br>PROGRAM CODE GROUP CORRESPONDING TO STEPS OF FLOW CHART SHOWN IN FIG. 11 |

MEMORY MAP OF STORAGE MEDIUM

FIG. 15

STORAGE MEDIUM SUCH AS FD/CD-ROM

| DIRECTORY INFORMATION |
|---|
| FIRST PROCESSING PROGRAM<br>PROGRAM CODE GROUP CORRESPONDING TO STEPS OF FLOW CHART SHOWN IN FIG. 5 |
| SECOND PROCESSING PROGRAM<br>PROGRAM CODE GROUP CORRESPONDING TO STEPS OF FLOW CHART SHOWN IN FIG. 13 |

MEMORY MAP OF STORAGE MEDIUM

IMAGE PROCESSING SYSTEM TO ADJUST IMAGE OUTPUT DATA

BACKGROUND OF THE INVENTION

1. Field of the Invention

The present invention relates to an image forming apparatus, an image processing method and a storage medium in an image processing system in which an external apparatus and an information processing apparatus perform a communication to carry out image processing.

2. Description of the Related Art

Japanese Patent Laid-Open No. 2004-9713 discloses a case where when a recording medium is inserted from a sheet feed unit to be set at a predetermined position, a recording start position is slightly shifted as the recording medium is inserted while being slightly inclined in an image forming apparatus.

Also, regarding the accuracy in the insertion positions for the recording medium in the image forming apparatus, deviations may occur to some extent. Due to this deviation, it is pointed out that the feeding positions for the leading part may be shifted, and an inclination can occur.

Image forming apparatuses provided with a tray adjustment function are proposed (see Japanese Patent Laid-Open No. 2002-337433). In this case, the image forming apparatuses include an image processing system adapted to receive image data from an external apparatus after the tray adjustment is performed and output the image to an image processing apparatus and an image processing system adapted to receive image data from an external apparatus and execute a tray adjustment in an image processing apparatus.

Also, an image processing system is proposed which is adapted to output image data opened up into a raster image from an external apparatus to an image forming apparatus.

In some of such image processing systems, when the external apparatus opens up the image data into the raster image, by taking into account the positional shift due to the sheet feeding unit, the positional shift may be adjusted by adjusting the opening position of the raster image.

However, in the image forming apparatus, print processing may be carried out by, in some cases, automatically switching to a sheet feeding unit that is different from the sheet feeding unit specified by a print job among a plurality of sheet feeding units.

For example, in a case where a sheet post-processing apparatus is connected to the image forming apparatus to perform staple processing, the sheet orientation specified by the print job and the opening area of the raster image may be varied. In this case, control in collaboration with the tray adjustment function is not executed while automatically corresponding to the switch of the sheet feeding units.

For this reason, it can occur that the print job cannot be efficiently processed by effectively utilizing the tray adjustment function.

In particular, in a case where the external apparatus performs the tray adjustment, it can occur that the automatic sheet feeding stage change on the image forming apparatus side cannot be coped with, the rotation/bookbinding processing cannot be coped with, and raggedness or unevenness is generated when skew correction is carried out, for example.

Also, in a case where the tray adjustment is performed on the image forming apparatus side, it can occur that a half tone simulation job cannot be coped with.

It is noted that the factor for changing the sheet feeding units is not limited to the above-described sheet post-processing. For example, even when the sheet sizes are identical to each other, it may be necessary to similarly change the sheet feeding units also in a case where the sheet orientations and the opening area of the raster image are varied.

Therefore, in a case where the image rotation is generated in relation to finishing such as stapling, effects which are expected to be obtained with the tray adjustment function (image position shift adjustment function) cannot be obtained.

SUMMARY OF THE INVENTION

According to an embodiment of the invention, an image processing system is provided having an image forming apparatus and an external apparatus, the image forming apparatus and the external apparatus performing a communication to carry out image processing. The external apparatus includes: a holding unit configured to hold one or more adjustment values for adjusting a positional shift of an image formed on a recording medium which is fed from a plurality of sheet feeding units provided to the image forming apparatus for each sheet feeding unit; a generation unit configured to generate, on the basis of any one of the adjustment values as selected in accordance with sheet feeding control information which is specified by a print job received from an information processing apparatus, image data in which the positional shift is corrected from the print job; an output unit configured to output the image data generated by the generation unit and the sheet feeding control information specified by the print job to the image forming apparatus; and a reception unit configured to receive notification from the image forming apparatus of sheet feeding control information related to the sheet feeding unit capable of performing the sheet feeding, and to receive a readjustment request for requesting image data to be readjusted while following the sheet feeding control information from the image forming apparatus in accordance with generation of a factor according to which the image forming apparatus cannot perform sheet feeding while following the specified sheet feeding control information, after the image data is output from the output unit to the image forming apparatus. The generation unit regenerates image data in which the image positional shift is corrected while following the sheet feeding control information received from the image forming apparatus from the print job in a case where the reception unit receives the sheet feeding control information and the readjustment request from the image forming apparatus, and the output unit outputs the image data regenerated by the generation unit to the image forming apparatus. The image forming apparatus includes: a determination unit configured to determine whether the factor is generated according to which the sheet cannot be fed while following the sheet feeding control information from the external apparatus regarding the image data output from the output unit; and a transmission unit configured to transmit to the external apparatus, the sheet feeding control information related to the sheet feeding unit capable of performing the sheet feeding and the readjustment request for requesting retransmission of the image data in which the positional shift is corrected from the print job on the basis of the sheet feeding control information in a case where the determination unit determines that the factor according to which the sheet cannot be fed is generated. According to another aspect of the present invention, there is provided an image processing system having an image forming apparatus and an external apparatus, the image forming apparatus and the external apparatus performing a communication to carry out image processing. The external apparatus includes: a holding unit configured to hold one or more adjustment values for adjusting a positional shift of an image formed on a recording medium which is fed from a plurality of sheet feeding units provided to the image forming apparatus for each sheet feeding unit; a generation unit configured to generate image data to be output to the recording medium in accordance with a print job received from an information processing apparatus; an output unit configured to output to the image forming apparatus, the image data generated by the generation unit, and an adjustment value corresponding to the sheet feeding unit as selected in accordance with sheet feeding control information which is specified by the print job; and a reception unit configured to receive notification from the image forming apparatus of a readjustment request for requesting a new adjustment value related to the sheet feeding unit capable of performing sheet feeding from the image forming apparatus after the output unit outputs the image data and the adjustment value to the image forming apparatus, in accordance with generation of a factor according to which the image forming apparatus cannot perform sheet feeding while following the specified sheet feeding control information from the sheet feeding unit corresponding to the adjustment value. The output unit outputs the new adjustment value related to the sheet feeding unit capable of performing the sheet feeding to the image forming apparatus while following the readjustment request received by the reception unit. The image forming apparatus includes: a correction unit configured to correct an image positional shift on the image data on the basis of the adjustment value received from the external apparatus when the image data output from the output unit is output to the recording medium fed from the selected sheet feeding unit; a determination unit configured to determine whether the factor is generated according to which the sheet feeding cannot be performed from the sheet feeding unit corresponding to the adjustment value regarding the image data output from the output unit; and a transmission unit configured to transmit to the external apparatus, the readjustment request for requesting the new adjustment value with respect to the sheet feeding unit in a case where the determination unit determines that the factor is generated according to which the sheet feeding cannot be performed from the sheet feeding unit corresponding to the adjustment value. The correction unit performs the image positional shift correction with respect to the received image data on the basis of the new adjustment value received from the external apparatus.

According to still another aspect of the present invention, there is provided an image processing system having an information processing apparatus and an external apparatus, the information processing apparatus transmitting a print job to the external apparatus, and the external apparatus transmitting image data generated in the external apparatus to an image forming apparatus. The information processing apparatus includes: a specification unit configured to specify as a mode for adjusting an image positional shift, a first mode for adjusting the image positional shift when the external apparatus generates image data or a second mode for adjusting the image positional shift when the image forming apparatus outputs the image data received from the external apparatus; a change unit configured to change the first mode or the second mode specified by the specification unit into the second mode or the first mode on the basis of an image processing request with respect to the print job; and a second specification unit configured to specify the first mode or the second mode changed by the change unit with respect to the print job.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 illustrates a tray adjustment pattern example printed by the image processing apparatus shown in FIG. 1A.

FIG. 8 illustrates an example of a tray adjustment value management table which is managed by the external controller shown in FIG. 1A.

FIG. 9 is a flow chart for describing an example of a second data processing of the image processing system according to the embodiment of the present invention.

FIG. 11 is a flow chart for describing an example of a third data processing of an image processing system according to an embodiment of the present invention.

FIG. 14 is an explanatory diagram for describing an example of a memory map of a storage medium storing various data processing programs which can be read by the image processing system according to the embodiment of the present invention.

FIG. 15 is an explanatory diagram for describing an example of a memory map of the storage medium storing various data processing programs which can be read by the information processing apparatus according to the embodiment of the present invention.

DESCRIPTION OF THE EMBODIMENTS

Description of System Configuration

System Configuration

Figure 1A:
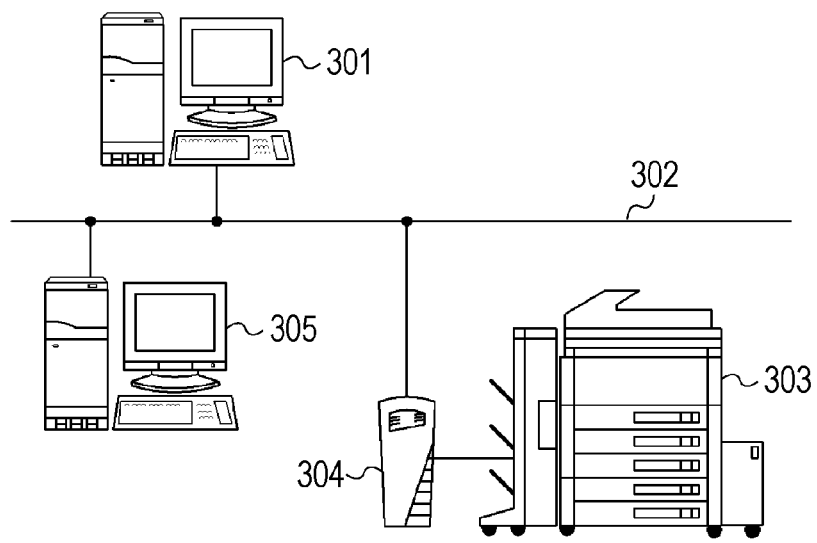
FIG. 1A is an explanatory diagram for describing an example of a configuration of an image processing system according to the embodiment of the present invention.
Figure 2:
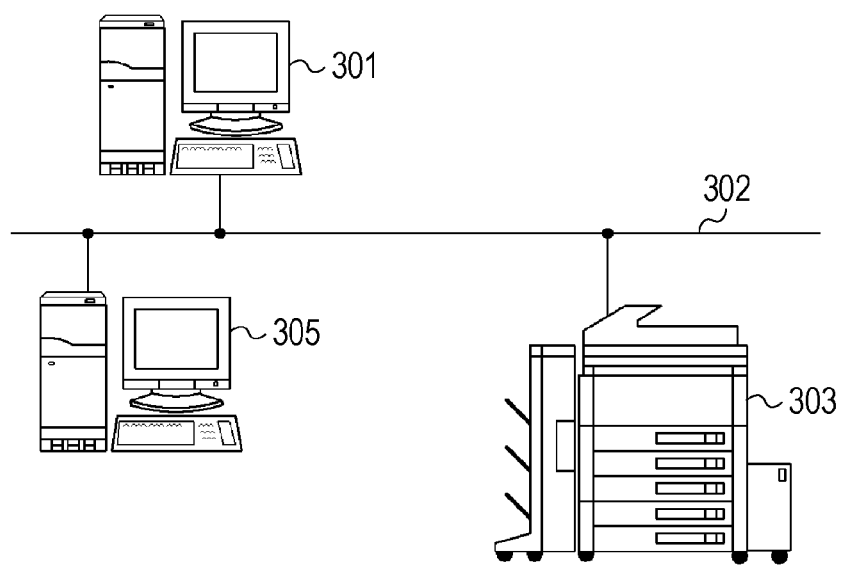
FIG. 2 is an explanatory diagram for describing an example of a configuration of an image processing apparatus according to the embodiment of the present invention.

FIGS. 1A and 2 are explanatory diagrams for describing a configuration of an image processing system according to an embodiment of the present invention. It is noted that the image processing system shown in FIG. 1A is a system example in which an external controller 304 connected to a network 302 and an image processing apparatus 303 are connected to each other via a predetermined interface. According to the present embodiment, such an example is described that the image processing apparatus 303 performs a processing for forming an image on a recording medium, but the image forming apparatus may also be configured by using a printer or the like other than the image processing apparatus 303.

In contrast to this, the image processing system shown in FIG. 2 is a system example in which the image processing apparatus 303 is connected to the network 302.

Also, according to the present embodiment, in the case of the system shown in FIG. 1A, a raster image processing (RIP processing) may be performed by the external controller 304. In the case of the system shown in FIG. 2, the image processing apparatus 303 may perform the RIP processing.

In FIG. 1A, client PCs 301 and 305 are provided with a controller unit including a CPU, a RAM, and a ROM, an input device, an output device, an external storage, and a network controller (NIC). Herein, the NIC represents Network Interface Card.

Herein, the input device can include at least one of a key board, a pointing device, and the like, and the output device may include a display apparatus.

Also, a predetermined operation system (OS), an application, and a device driver may be installed into the external storage. Various applications may be loaded onto the RAM and executed to carry out data processing.

Furthermore, the device driver can display various user interfaces on the display apparatus to perform a print setting with respect to the image processing apparatus 303. It is noted that tray adjustment will be described below.

Figure 3:
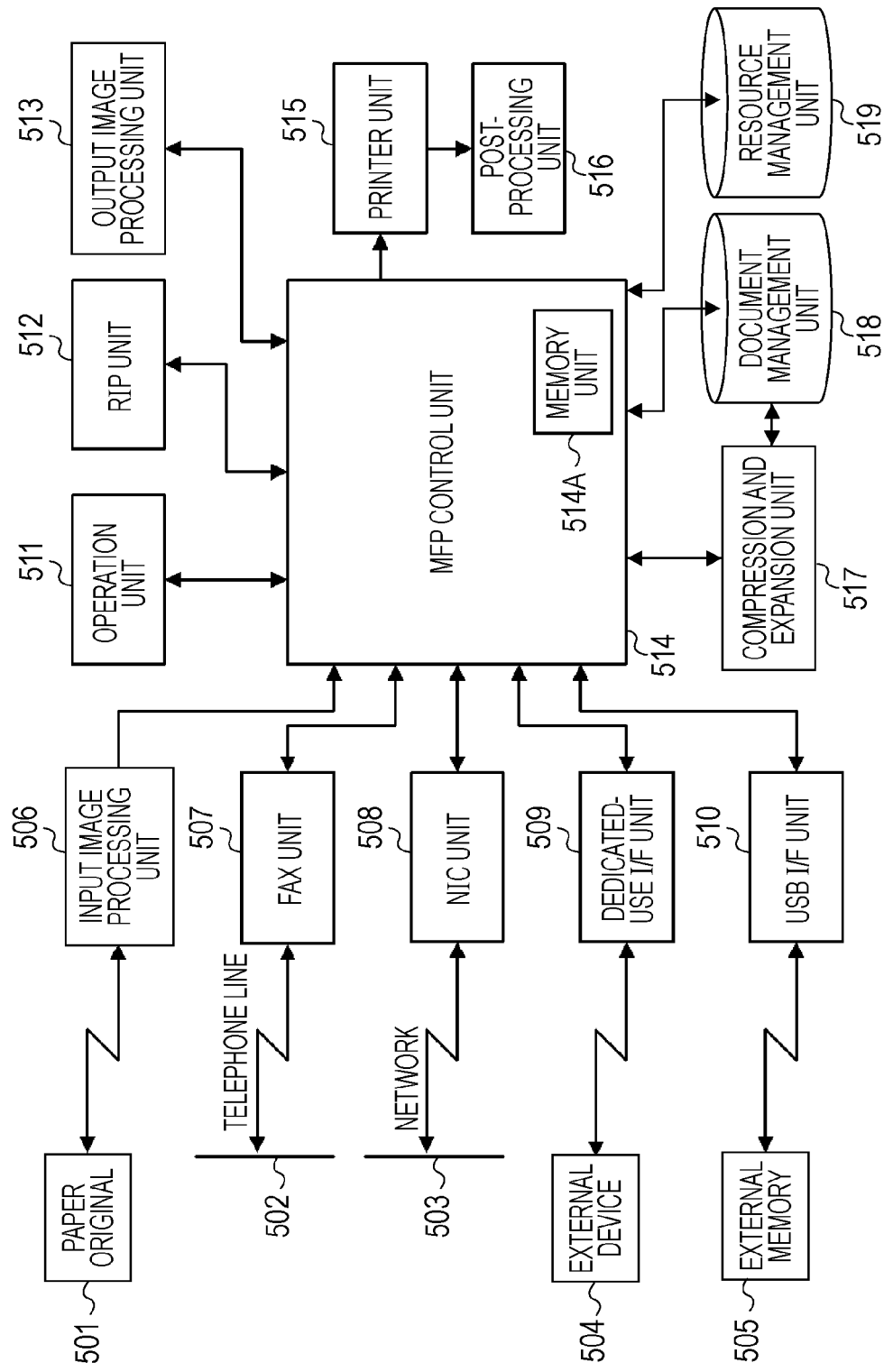
FIG. 3 is a block diagram for describing an example of a configuration of the image processing apparatus shown in FIG. 2.

A multi function printer (MFP) 303 is an image processing apparatus and performs image forming processing on the basis of the print data received from the external controller 304. It is noted that the MFP 303 may be provided with hardware resources, for example as shown in FIG. 3.

In one embodiment, the external controller 304 receives the print job from at least one of the client PC 305 and the client PC 301 to perform the RIP processing and sends the print data to the image processing apparatus 303.

Figure 1B:
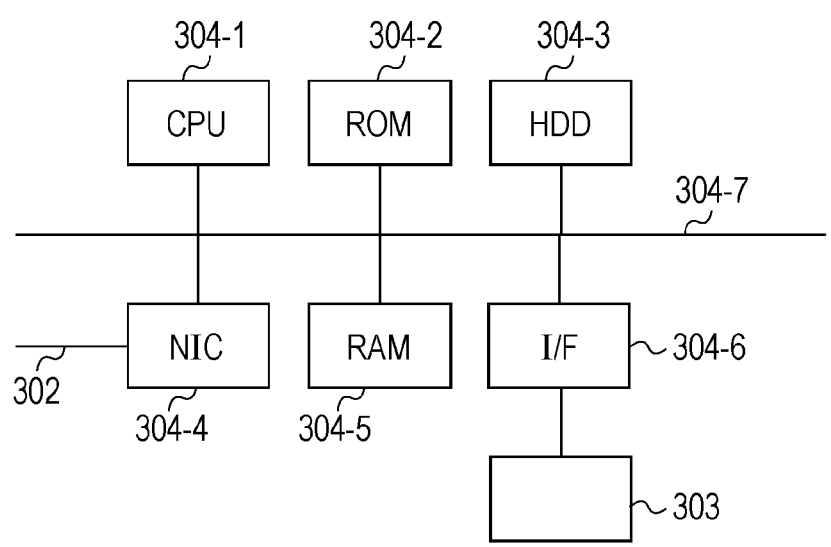
FIG. 1B is a block diagram for describing an example of a hardware configuration of an external controller shown in FIG. 1A.

It is noted that the external controller 304 may be provided with the hardware shown, for example, in FIG. 1B.

FIG. 1B is a block diagram for describing an example of the hardware configuration of the external controller 304 shown in FIG. 1A.

In the example shown in FIG. 1B, a CPU 304-1 executes a control program stored in a ROM 304-2 to control devices connected to a system bus 304-7. Onto a RAM 304-5, the control program executed by the CPU 304-1 and the application which performs the RIP processing are loaded. It is noted that the application which performs the RIP processing may be stored in an HDD 304-3. In addition, in the HDD 304-3, adjustment values with respect to the sheet feeding units provided to the image processing apparatus 303 may be stored as a table for each sheet feeding unit. It is noted that this table can be configured to be rewritable.

According to the present embodiment, a case is described where the CPU 304-1 executes the application to perform the RIP processing, but a configuration may also be adopted in which an image processor that performs the RIP processing is separately prepared to execute the RIP processing with hardware.

According to this embodiment, a network controller (NIC) 304-4 performs communication processing with a device connected to the network 302. An I/F 304-6 and the image processing apparatus 303 perform bi-directional communication processing.

It is noted that when the CPU 304-1 executes the RIP processing, it may be determined in units of page whether the tray adjustment is to be performed on the basis of a control procedure shown in FIG. 11, which will be described below.

The system configuration example of FIG. 2 is a configuration without an external controller as a unit adapted to execute the RIP processing function being built in the image processing apparatus 303.

FIG. 3 is a block diagram for describing an example of a configuration of the image processing apparatus 303 shown in FIG. 2. In the present example, the RIP processing is performed by a built-in RIP unit 512.

On the other hand, as shown in FIG. 2, in a case where the external controller 304 performs the RIP processing, an external device 504 may be connected via a dedicated-use I/F 509. Then, the external controller 304 outputs the image data on which the RIP processing is performed by itself via the dedicated-use I/F 509 and an MFP control unit 514 to a printer unit 515.

In the example shown in FIG. 3, an input image processing unit 506 reads a paper original 501 or the like by using an image reading apparatus such as a scanner and performs image processing on the read image data.

A NIC unit 508 supplies the image data input by utilizing a network 503 (e.g., mainly, PDL data) to the RIP unit 512 and transmits the image data inside the MFP and the apparatus information to the outside via a network.

In a RIP unit 512, the input PDL (Page Description Language) data is decoded and opened up in the RIP (Raster Image processor).

Next, the input image data is sent to the MFP control unit 514. The MFP control unit 514 functions as a traffic regulator for controlling the input data and the output data.

Also, the MFP control unit 514 may be provided with a memory unit 514A to temporarily store the input image data in the memory unit 514A. In addition, the MFP control unit 514 can optionally call the image data from the memory unit 514A.

An output image processing unit 513 applies image processing (e.g., including image rotation processing) on the image data to be printed by the printer unit 515 and outputs the image data to the printer unit 515.

In the printer unit 515, the sheet is fed from the storage unit stored in the sheet feeding stage, and the printing of the image data prepared by the output image processing unit 513 is performed in sequence on the sheet.

Then, the sheet printed out by the printer unit 515 is conveyed to a post-processing unit 516, and sheet sorting processing and sheet finishing processing (e.g., including staple processing) are carried out.

Furthermore, an operation unit 511 may be provided with a display unit and a key input unit for selecting the above-described various flows and functions and performing the operation instruction. It is noted that along with the higher resolution of the display apparatus in the operation unit 511, such a method of use can be adopted in which the image data in the memory unit is previewed, and the printing is performed in the case of OK after the check.

A compression and expansion unit 517 expands compressed document data managed by a document management unit 518 or compressed image data. In addition, the compression and expansion unit 517 can perform processing for compressing the document data or the image data in a predetermined compression format.

A resource management unit 519 may manage the hardware resource and software resource provided to the image processing apparatus in a distinguishable manner. An USB I/F unit 510 controls access with a USB memory functioning as an external memory 505. The USB I/F unit 510 may comprise not only a memory but also a USB device realizing another function.

A facsimile unit (FAX unit) 507 performs data communication with an external facsimile apparatus via a telephone line 502. The NIC unit 508 is connected via the network 503 to perform data communication processing based on a predetermined protocol.

In this manner, the image processing apparatus 303 may be configured to be able to execute the following examples of functional processing as the MFP function. Hereinafter, the flow of data will be represented by arrows.

At the time of a copy function execution, the data may flow according to a route of the input image processing unit 506→the output image processing unit 513→the printer unit 515.

At the time of a network scan function execution, the data may flow according to a route of the input image processing unit 506→the NIC unit 508.

At the time of a network print function execution, the data may flow according to a route of the NIC unit 508→the RIP unit 512→the output image processing unit 513→the printer unit 515.

Also, at the time of a box scan function execution, the data may flow according to a route of the input image processing unit 506→the output image processing unit 513→the memory unit 514A.

Furthermore, at the time of a box print function execution, the data may flow according to a route of the memory unit 514A→the printer unit 515.

Also, at the time of a box reception function execution, the data may flow according to a route of the NIC unit 508→the RIP unit 512→the output image processing unit 513→the memory unit 514A.

Furthermore, at the time of a box transmission function execution, the data may flow according to a route of the memory unit 514A→the NIC unit 508.

Also, at the time of a preview function execution, the data may flow according to a route of the memory unit 514A→the operation unit 511.

Setting Procedure for Tray Adjustment

Figure 4:
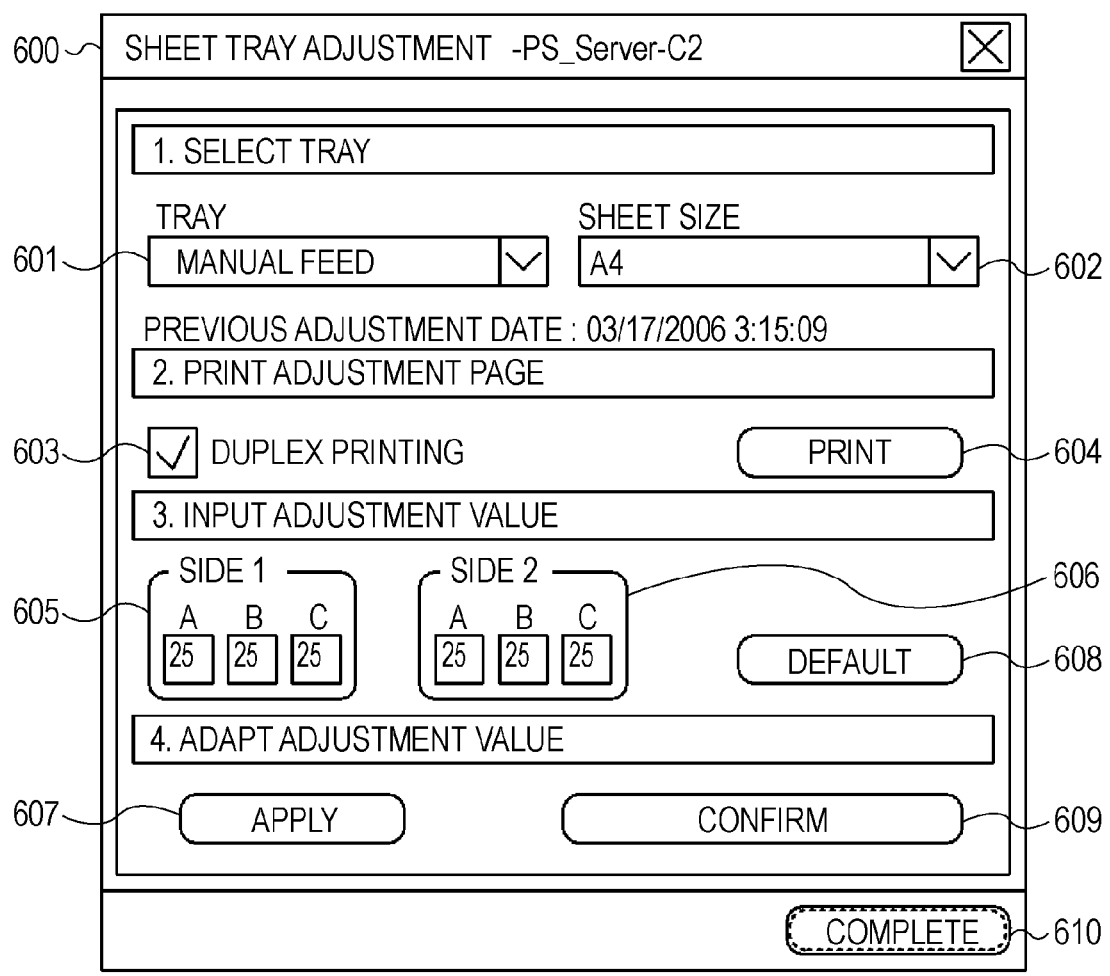
FIG. 4 illustrates a user interface example which is displayed on a client PC shown in FIG. 1A.

FIG. 4 illustrates an example of the user interface displayed on the display apparatus 305 of the client PC 301 shown in the embodiment of FIG. 1A. The present example is an example of a tray adjustment screen 600.

In the example shown in FIG. 4, a sheet tray 601 specifies the tray to be adjusted. In the example as shown, a manual feed tray is specified. A sheet size 602 specifies the size of the sheet that should be fed from the sheet tray 601. In the example as shown, the state corresponds to a specification of "A4" as the sheet size.

A check box 603 may be specified by a user operation in a case where the printing of the adjustment page is duplex printing. When a print button 604 is specified, the adjustment pattern is printed by the printer unit 515.

According to this example, a correction value input field 605 is a correction value input field for the tray adjustment, and adjustment values are input to input units A to C. It is noted that for this adjustment value, as described above, when the adjustment pattern printed by the printer unit 515 is folded, a numeric value of an adjustment index is specified, and thus the user reads the printed numeric value of the adjustment index to input the value to each of the input units A to C.

An adjustment value application button 607 is an application button. With a default button 608, "25" is input to all the input units A to C. Denoted by reference numeral 609 is a confirm button. A completion button 610 may be pressed by the user when this user interface is closed.

Figure 5:
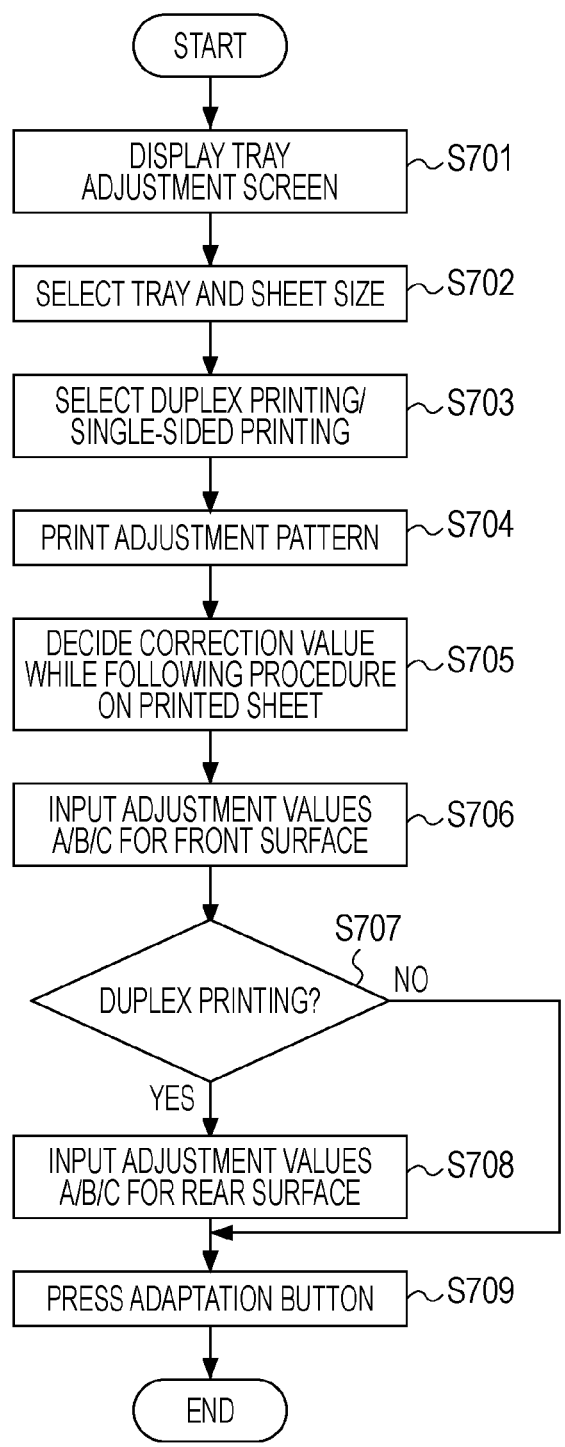
FIG. 5 is a flow chart for describing an example of a data processing procedure in an information processing apparatus according to the embodiment of the present invention.

FIG. 5 is a flow chart for an example of the data processing procedure of the information processing apparatus according to the present embodiment. The present example is a tray adjustment processing example. It is noted that S701 to S704, and S706 to S709 represent respective steps. In addition, the respective steps may be realized while the CPUs of the client PCs 301 and 305 load tray adjustment application software onto the RAM for execution.

In S701, via a UI provided by the tray adjustment application software, the tray adjustment screen 600 is displayed on the display apparatus provided to the client PC.

Next, in S702, the user operates the input device to set the manual feed for the sheet tray 601 of the tray adjustment screen 600, for example, and also selects the "A4" size for the sheet size 602.

Furthermore, after the selection of the duplex/single-sided printing by the check box 603 in S703, the print button 604 may be pressed to output the adjustment pattern data to the printer unit 515 for performing the tray adjustment in S704, thus printing the adjustment pattern.

It is noted that the adjustment pattern may be provided by way of a file managed by the tray adjustment application software.

FIG. 6 illustrates an example of the tray adjustment pattern printed by the image processing apparatus 303 shown in the embodiments of FIGS. 1A and 1B.

It is noted that in a case where the check box 603 shown in FIG. 4 is specified, two pages of tray adjustment patterns 801 and 802 may be printed as adjustment sheets by the printer unit 515.

Next, in S705, the user folds the short side and the long side of the adjustment sheet respectively into half and reads intersecting points of folding lines and scale marks A, B, and C printed as the indices on the adjustment sheet. The values indicated by the intersecting points of the scale marks A, B, and C and the folding lines are the correction values representing the positional shift amount of the image and correspond to values that should be input to the input units A to C of the correction value input field 605 for the tray adjustment in the example shown in FIG. 4. With this configuration, the correction values can be decided.

Next, in S706, the correction values A/B/C decided in S705 are respectively input to the input units A to C of the correction value input field 605 for the front surface.

Next, in S707, the tray adjustment application software determines whether the check box 603 is specified. Herein, in a case where the tray adjustment application software determines that the check box is specified, that is, in the case of the duplex printing (YES in step S707), processing proceeds to step S708, where similarly, the input for the rear surface is performed with respect to the correction value input field 606.

It is noted that when the tray adjustment application software determines in S707 that the duplex printing is not instructed (NO in step S707), the processing flow advances to S709.

Then, in S709, the user operates the pointing device or the like to press the adjustment value application button 607 on the tray adjustment screen 600 which is displayed on the display apparatus. After the adjustment value is reflected, the tray adjustment processing is ended.

Figure 7:
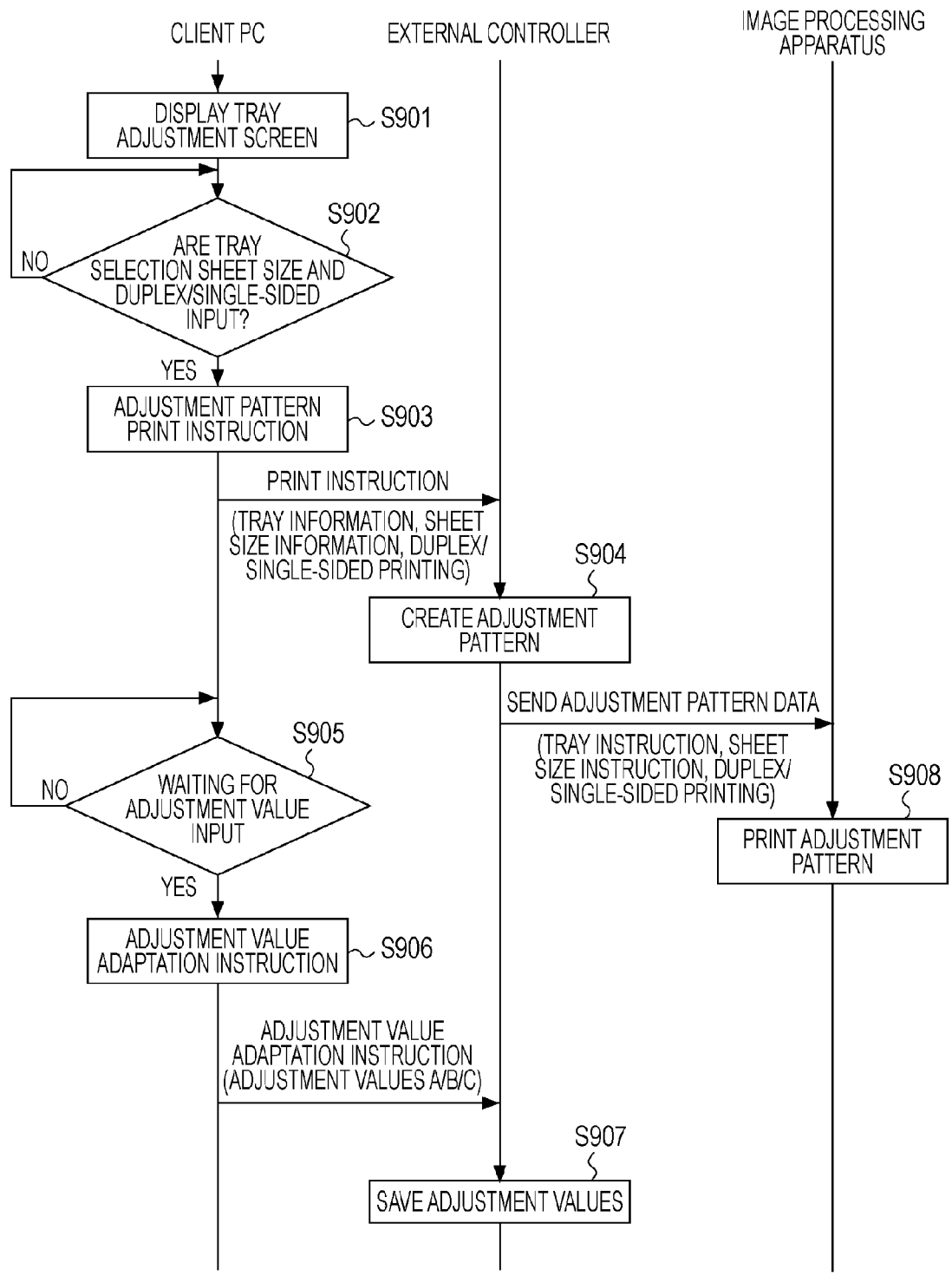
FIG. 7 is a flow chart for describing an example of a first data processing of the image processing system according to the embodiment of the present invention.

FIG. 7 is a flow chart for describing an example of first data processing of the image processing system according to the present embodiment. The present example is a setting processing example for the tray adjustment value with respect to the client PC 301 or the RIP unit of the external controller 304 or the image processing apparatus 303. In addition, the present processing is described by way of an example to be processed by the client PC 301, but the processing can also be similarly performed by using the client PC 305. It is noted that in the present example, the sheet feeding control information related to the sheet feeding unit capable of performing the sheet feeding includes tray information, sheet size information, and information related to the duplex/single-sided printing.

It is noted that S901, S902, S903, S905, and S906 correspond to the processing procedure of the client PC 301, and S904 and S907 correspond to the processing procedure of the RIP unit of the image processing apparatus 303 or the external controller 304 in this example. In addition, in this example S908 corresponds to the processing procedure of the printer unit 515 of the image processing apparatus 303.

In S901, the tray adjustment application software executed by the CPU of the client PC 301 displays the tray adjustment screen 600 on the display apparatus provided to the client PC 301.

In S902, the tray adjustment application software executed by the CPU of the client PC 301 stands by until instructions on the sheet tray where the tray adjustment is performed and the sheet size and the duplex printing or the single-sided printing are input. If the instructions have not been input (NO in step S902) then S902 is repeated.

Then, after the user inputs the sheet tray where the tray adjustment is performed and the sheet size and the duplex printing or the single-sided printing, for example, with respect to the tray adjustment screen 600 (YES in step S902), processing proceeds to S903, where the print button 604 of the tray adjustment sheet is specified to provide the adjustment pattern print instruction. At this time, the sheet tray and sheet size information and the information related to the duplex/single-sided printing input in S902 are also transmitted together to a RIP apparatus.

With this configuration, the RIP apparatus is notified of the print instruction of the adjustment pattern. Included herein, are cases where, for example, the RIP apparatus is provided to the external controller 304 of the image processing apparatus 303 as shown in the embodiment of FIG. 1, and cases where the RIP apparatus is built in the image processing apparatus 303. The present example is an example where the RIP processing is performed on the external controller 304.

In this manner, the RIP apparatus receiving the print instruction of the adjustment pattern uses the work memory to generate the adjustment pattern in S904 and outputs the adjustment pattern generated in the memory to the printer unit 515 of the image processing apparatus 303 as the adjustment pattern data.

It is noted that the image data of the adjustment pattern may be transmitted together with the sheet tray and sheet size information, and the information related to the duplex/single-sided printing to the image processing apparatus 303.

In response to this, in S908, the image processing apparatus 303 prints the adjustment pattern on the sheet of the instructed sheet feeding tray by the printer unit 515 to be output. With this configuration, the adjustment sheet which reflects the current positional shift of the printer unit 515, as shown for example in FIG. 6, may be obtained.

After that, the user folds the adjustment sheet printed by the printer unit 515 into half in the short side direction, and furthermore, folds the sheet into half in the long side direction, and then folding lines are made on the adjustment sheet.

Then, the index value instructed by the folding lines of the adjustment sheet folded by the user is determined as the current adjustment value with respect to the printer unit 515.

Then, in S905, the tray adjustment application software executed by the CPU of the client PC 301 stands by for the inputs to the respective input units A to C in the correction value input field 605 of the tray adjustment screen 600. If the inputs are not received (NO in step S905), then S905 is repeated. However once the adjustment value inputs have been received (YES in step S905), the processing flow proceeds to S906.

Then, in S906, the tray adjustment application software executed by the CPU of the client PC 301 checks whether the adjustment value application button 607 of the tray adjustment screen 600 is specified to give the adjustment value adaptation instruction. Then, after the check, the client PC 301 transmits the adjustment values input to the correction value input fields 605 and 606 to the RIP apparatus via the printer driver. According to the present embodiment, the adjustment values are transmitted to the external controller 304.

With this configuration, in S907, the RIP apparatus of the external controller 304 obtains the adjustment values transmitted from the tray adjustment application software. Then, the RIP apparatus saves the obtained adjustment values in a tray adjustment value management table AMTB, for example, in a non-volatile memory in the data format shown in the example of FIG. 8. Herein, the non-volatile memory is generally hard disk but may also comprise another non-volatile storage medium.

FIG. 8 illustrates an example of the tray adjustment value management table AMTB managed by the external controller 304 shown in the embodiments of FIGS. 1A and 1B.

As shown in the example of FIG. 8, according to the present embodiment, the tray adjustment value management table AMTB comprises a tray name and an adjustment value. In addition, such an example is represented that the adjustment value corresponds to the value decided by the index parts of the adjustment sheet and the folding lines shown in FIG. 6 and thus is managed while associated with index units A to C.

It is noted that according to the present embodiment, the case where a tray adjustment screen is displayed on the display apparatus of the client PC 301 has been described, but the tray adjustment screen may also be displayed on the operation unit 511 provided to the image processing apparatus 303.

Tray Adjustment Print Job Processing

Hereinafter, a case will be described of an example of processing on the print job in which the image positional shift adjustment is instructed.

FIG. 9 is a flow chart for an example of a second data processing procedure in the image processing system according to the present embodiment. The present example is the adjustment processing example of the tray adjustment value with respect to the client PC 301 or the RIP unit of the external controller 304 or the image processing apparatus 303. In addition, the present processing is described by way of an example to be processed by the client PC 301, but the processing can also be similarly performed in the client PC 305. It is noted that S101 to S108 represent the respective steps. In addition, the respective steps may be realized as the CPU of the client PC 301, the external controller 304, or the image processing apparatus 303 loads the control program onto the RAM for execution.

It is noted that S100 corresponds to the processing procedure of the client PC 301. S101 to S105 and S107 correspond to the processing procedure of the RIP unit of the external controller 304, and S106 corresponds to the processing procedure of the image processing apparatus 303. In addition, the present example is an example of carrying out the image position adjustment processing on the external controller 304 side. Hereinafter, an example description will be provided of an outline of the adjustment processing. It is noted that the adjustment value for each sheet feeding stage may be stored as a table in the HDD 304-3 of the external controller 304, and the CPU 304-1 is configured to be able to refer to the adjustment value. It is noted that in the present example, the sheet feeding control information related to the sheet feeding unit capable of performing the sheet feeding includes tray information, sheet size information, and information related to the duplex/single-sided printing.

First, in S100, the client PC 301 executes the application to create data that should be printed. Then, the client PC 301 transmits the print job generated from the above-described data that should be printed to the external controller 304. Herein, the generation and transmission processing of the print job is carried out by the printer driver installed into the client PC 301. The processing of the client PC 301 will be described in greater detail below.

Figure 10A:
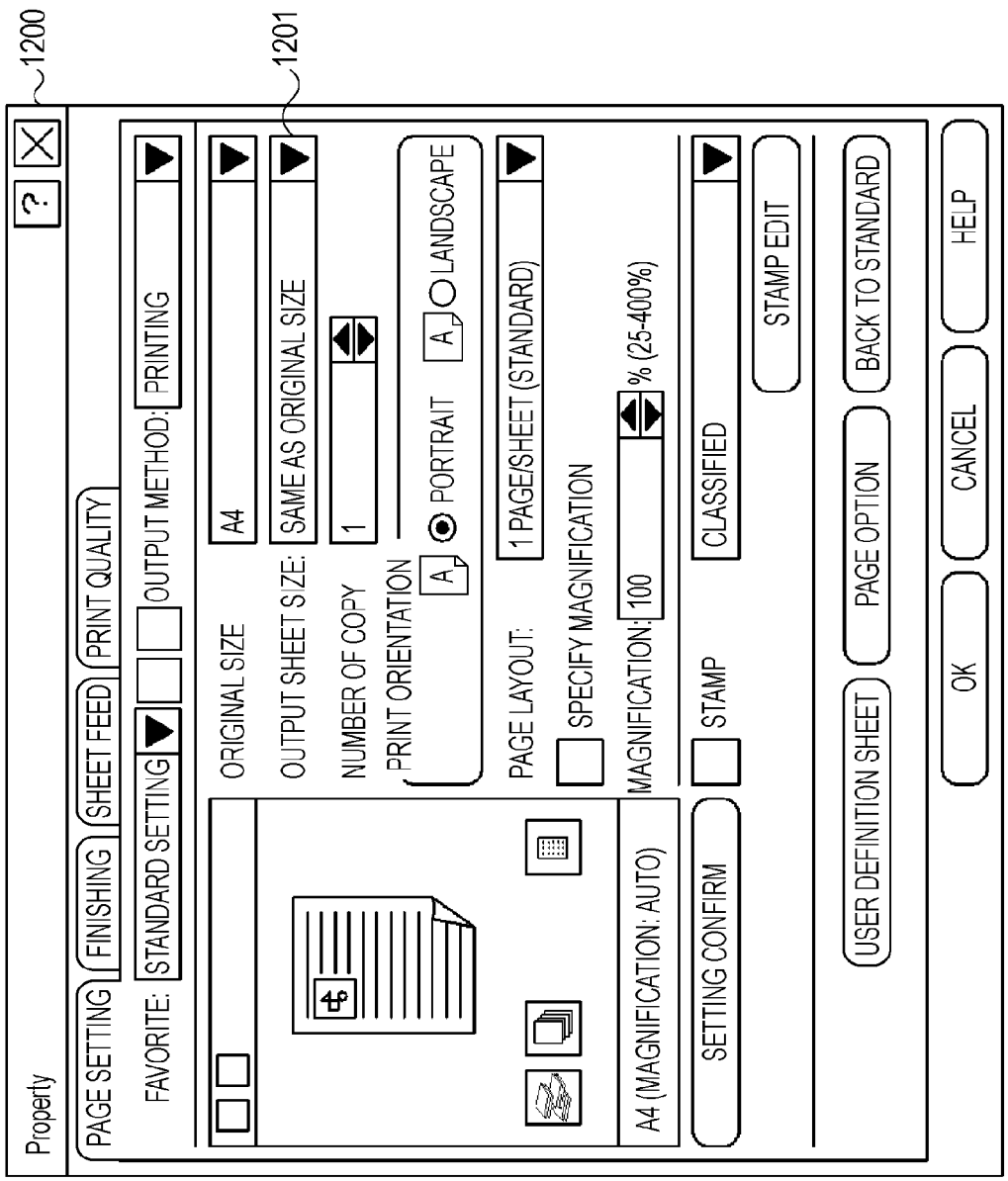
FIG. 10A illustrates a user interface example which is displayed on a display apparatus of the client PC shown in FIG. 1A.
Figure 10B:
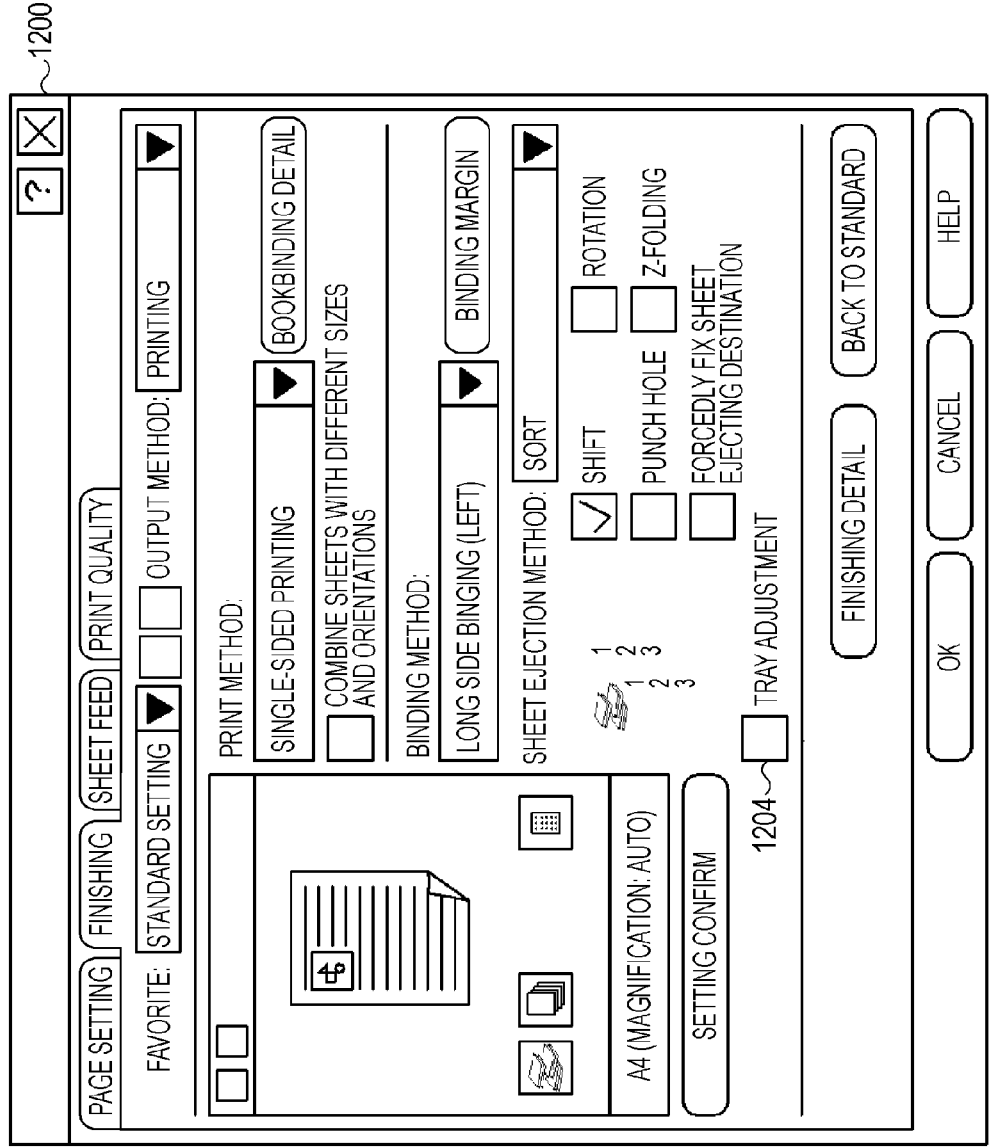
FIG. 10B illustrates a user interface example which is displayed on the display apparatus of the client PC shown in FIG. 1A.

The user inputs the print job to the external controller 304 via the user interface provided by the printer driver shown in FIGS. 10A and 10B.

FIGS. 10A and 10B illustrate an example of a user interface 1200 displayed on the display apparatus of the client PC 301 shown in FIG. 1A. The present example is a user interface provided by the printer driver which is installed into the storage of the client PC 301. The user interface may be displayed on the display apparatus when printing is instructed from the application.

It is noted that the present user interface corresponds to a case where property is selected in the printer driver. The property is composed of a plurality of tab sheets. FIG. 10A corresponds to a case where a page setting tab is selected, and FIG. 10B corresponds to a case where a finishing tab is selected.

In FIG. 10A, an output sheet size setting unit 1201 corresponds to a state in which the same size as the original size is instructed.

Also, in FIG. 10B, by setting ON or OFF if a check box 1204, it is instructed as to whether the tray adjustment is carried out. It is noted that when the check is input, a flag indicating the tray adjustment ON specification is set in the print job.

Returning to FIG. 9, in S101, when the external controller 304 receives the print job from the printer driver of the PC 301 (YES in step S101), processing proceeds to S102, where the external controller 304 determines whether the received print job is the tray adjustment specification job by analyzing the received job information. If the print job has not been received (NO in step S101), then S101 is repeated. Herein, in a case where it is determined that the external controller 304 has not set the tray adjustment specification job (NO in step S102), the processing flow advances to S104. In other words, in a case where there are many adverse effects due to an object structure in the page, without performing the adjustment, the RIP processing may be carried out. Herein, the adverse effects can correspond to a case where jaggy or uneven lines are generated when the line drawing or the like is subjected to the RIP processing, for example. Therefore, in a case where the external controller 304 determines that there are many line drawings as the objects, the external controller 304 may carry out the RIP processing without performing the tray adjustment.

On the other hand, in S102, in a case where the external controller 304 determines that the tray adjustment specification job is to be set (YES in step S102), the processing flow advances to S103, and it is determined as to whether or not the tray adjustment is performed in units of pages. Herein, in a case where the external controller 304 determines that the tray adjustment is performed in units of pages (YES in step S103), the processing flow advances to S105, and a reference is made to the adjustment value for the sheet feeding stage held in the table AMTB shown in FIG. 8, and the RIP processing is carried out accompanying the image adjustment.

On the other hand, in S103, in a case where the external controller 304 determines that the tray adjustment is not performed in units of pages (NO in step S103), the processing flow advances to S104, and the RIP processing is carried out without performing the tray adjustment.

In this manner, when the external controller 304 ends the RIP processing, in S110, the external controller 304 transmits the image data on which the RIP processing is carried out to the image processing apparatus 303.

After that, the image processing apparatus 303 prints the image data received from the external controller 304 in the printer unit 515.

At this time, in S106, regarding the image processing apparatus 303, in the printer unit 515, the sheets may run out in the sheet feeding stage specified by the print job (for example, A4 (portrait; the sheet is fed on the longitudinal side to an engine unit of the printer unit 515)). Herein, the image processing apparatus 303 may also automatically select the sheet feeding from the sheet feeding stage of A4R (landscape (the sheet is fed on the lateral side to the engine unit of the printer unit 515)) which is another sheet feeding stage different from the above-described sheet feeding stage and has the same sheet size. It is noted that herein, the information for specifying the next sheet feeding tray functions as sheet feeding destination information for identifying any one of the sheet feeding units among the plurality of sheet feeding units. Also in S106, the re-adjustment factor may be generated.

In this case, in S108, the MFP control unit 514 of the image processing apparatus 303 transmits the readjustment request and the information on the sheet feeding stage to be used next time to the external controller 304.

Next, in S108, when the external controller 304 receives the readjustment request and the information on the sheet feeding stage used next time from the image processing apparatus 303, in S107, the external controller 304 obtains the adjustment value corresponding to the received sheet feeding stage from the above-described table AMTB.

Then, in S107, the external controller 304 carries out the RIP processing again on the basis of the obtained tray adjustment value. Herein, the external controller 304 carries out the RIP processing again on the already received print job on the basis of the obtained tray adjustment value. Next, in S109, the external controller 304 retransmits the image data subjected to the regeneration (the RIP processing again) by changing the adjustment value to the image processing apparatus 303.

With this configuration, the external controller 304 can execute the RIP processing accompanying the tray adjustment again corresponding to the changed sheet feeding stage in adapting to the change request of the sheet feeding stage by the image processing apparatus 303.

Hereinafter, a specific example of processing in the external controller 304 will be described in detail.

In S101, when the external controller 304 receives the print job from the client PC 301 via the network 302, in S102, the CPU of the external controller 304 determines whether the tray adjustment is a job that is specified as being ON. To be more specific, the CPU of the external controller 304 refers to the flag set in the print job to determine whether the above-described tray adjustment is the print job specified as set ON.

Herein, in a case where the CPU of the external controller 304 determines that the tray adjustment of the print job has been specified as being set OFF, in S104, the processing of the tray adjustment is not performed, and only the RIP processing is carried out.

On the other hand, in a case where the CPU of the external controller 304 determines in S102 that the tray adjustment for the print job is specified as being set ON, in S103, the object of each page is analyzed to determine whether the tray adjustment is carried out for each page.

It is noted that in the object analysis, in the case of a graphic attribute such as a line drawing, when a correction accompanying a rotation (skew correction) is carried out, a possibility that ragged or uneven lines are generated may be large. In view of the above, for example, in a case where the number of graphic objects in the page is equal to or larger than a predetermined value, the tray adjustment may not be carried out.

Also, it is possible to include the size of the object and the like as the determination criteria.

Then, in S103, with respect to the page where the CPU of the external controller 304 determines to carry out the tray adjustment, the tray adjustment value set in the table AMTB example shown in FIG. 8 may be applied to carry out the RIP processing.

To be more specific, the CPU of the external controller 304 may calculate a rotation amount from the difference between the adjustment value A and the adjustment value C, and also calculates a shift amount and the like from the adjustment value B, to shift and rotate the image when the RIP processing is carried out.

In this manner, the image data subjected to the RIP processing by the external controller 304 is transferred in S110 from the external controller 304 to the image processing apparatus 303 and printed by the printer unit 515.

On the other hand, such factors one or more of the switching of the sheet feeding trays, the rotation of the image due to the relation with the finishing such as stapling, and the like may be generated so that the image processing apparatus 303 may need to change the adjustment value for the readjustment. In this case, in S108, the MFP control unit 514 of the image processing apparatus 303 transmits the readjustment request to the external controller 304.

It is noted that at the time of the readjustment request, the MFP control unit 514 may also transmit one or more of the changed tray, the sheet size, and the information on the rotation at the same time.

Then, the external controller 304 receiving the readjustment request from the image processing apparatus 303 changes the adjustment value and carries out the RIP processing again in S107. In S109, the external controller 304 transmits the image data subjected to the RIP processing again to the image processing apparatus 303.

According to the present embodiment, in a case where the image data subjected to the RIP processing on the basis of the tray adjustment value is output by the image processing apparatus, even when the factor with which the adjustment value is generated is readjusted, the external controller can continue the print processing while applying an appropriate RIP processing again.

According to the above-described embodiment, the case where the external controller 304 executes the RIP processing and the RIP processing accompanying with the tray adjustment has been described, and the tray adjustment processing can be executed on the image processing apparatus 303 side in some cases.

In view of the above, in a case where the factor with which the adjustment value is changed and readjusted is generated, the image processing apparatus 303 may request the external controller 304 for the adjustment value with respect to the changing sheet feeding stage and execute the tray adjustment on the basis of the adjustment value obtained from the external controller 304. Hereinafter, the embodiment will be described. It is noted that the adjustment value for each sheet feeding stage is stored as a table in the HDD 304-3 of the external controller 304, and the CPU 304-1 is configured to be able to refer to the adjustment value.

Hereinafter, on the basis of a flow chart shown in FIG. 11, an example of the tray adjustment processing according to the present embodiment will be further described in detail.

FIG. 11 is the flow chart for describing an example of third data processing of the image processing system according to the present embodiment. In the present example, the external controller 304 holds the tray adjustment value, and the external controller 304 executes the RIP processing on the received print job. After that, the image processing apparatus 303 corresponds to an example where in a case where the image adjustment factor is generated, the image processing apparatus 303 obtains the adjustment value from the external controller 304 to carry out the image readjustment. The respective steps may be realized as the CPU of the client PC 301, the external controller 304, or the image processing apparatus 303 loads the control program onto the RAM for execution.

It is noted that S1100 corresponds to the processing procedure of the client PC 301. S1101 to S1105 and S1107 correspond to the processing procedure of the RIP unit of the external controller 304. S1106 corresponds to the tray adjustment and the print processing procedure executed by the MFP control unit 514 of the image processing apparatus 303. It is noted that in the present example, the sheet feeding control information related to the sheet feeding unit capable of performing the sheet feeding includes tray information, sheet size information, and information related to the duplex/single-sided printing.

In the example of FIG. 9, after the tray adjustment value is set, in S101, the external controller 304 stands by to receive the print job transmitted in S100S110 from the client PC 301.

On the other hand, the user may input the print job from the printer driver shown in FIG. 10A. In FIG. 10A, together with a sheet size setting 1201 and the like, the selection between ON and OFF of the tray adjustment can be performed by a check box 1204 in the tray adjustment. Hereinafter, a specific configuration will be described.

First, in S1100 of FIG. 11, the client PC 301 executes the application to create the data that should be printed. Then, the client PC 301 transmits the print job generated from the above-described data that should be printed to the external controller 304. Herein, the generation and transmission processing of the print job is performed by the printer driver installed into the client PC 301.

In S1101, when the external controller 304 receives the print job from the client PC 301 (YES in step S1101), processing proceeds to S1102, where it is determined as to whether or not the tray adjustment is a job specified as being set ON. If the print job has not been received (NO in step S1101), then S1101 is repeated. Herein, in a case where the external controller 304 determines that the tray adjustment has been specified as a print job set as being OFF (NO in step S1102), the processing flow advances to S1105, and the external controller 304 carries out only the RIP processing without performing the processing of the tray adjustment. As described above, in the print job, in the case of a graphic attribute such as a line drawing, when a correction accompanying a rotation (e.g., skew correction) is carried out, a possibility that the ragged or uneven lines are generated may be large. For this reason, for example, in a case where the number of graphic objects in the page is equal to or larger than a predetermined value, the tray adjustment may not be carried out. In addition, it is possible to include the size of the object and the like as the determination criteria.

On the other hand, in S1102, in a case where the external controller 304 determines that the tray adjustment is a print job that has been specified as being ON (YES in step S1102), the processing flow advances to S1103. Then, in S1103, the object of each page is analyzed to determine whether the tray adjustment is carried out for each page. Herein, in a case where the external controller 304 determines the tray adjustment is to be performed (YES in step S1103), processing proceeds to S1104 where, with respect to the relevant page, any one of the tray adjustment values corresponding to the sheet feeding unit managed by the table AMTB shown in FIG. 8 is transmitted to the image processing apparatus 303, after which processing proceeds to S1105 where RIP processing is performed on the print data. If the tray adjustment is determined not to be performed for the page (NO in step S1102), processing also proceeds to S1105.

After that, the image processing apparatus 303 receives the image data subjected to the RIP processing and the adjustment value for performing the print position adjustment. Then, the image processing apparatus 303 applies the adjustment value to carry out the print position adjustment for the printing.

Then, during the print processing in the image processing apparatus 303, in S1106, a factor including one or more of the switching of the sheet feeding trays, the rotation of the image due to the relation with the finishing such as stapling, and the like may be generated so that the adjustment value is changed and readjusted. In such a case, the readjustment request is transmitted from the image processing apparatus 303 to the external controller 304 which carries out the RIP processing.

It is noted that at the time of the readjustment request, the changed tray, the sheet size, and the information on the rotation may also be transmitted at the same time.

In this manner, the external controller 304 receiving the readjustment request from the image processing apparatus 303 transmits the adjustment value satisfying the condition again in S1107, and the image processing apparatus 303 performs the print position adjustment while applying the readjustment value for the printing.

Figure 12:
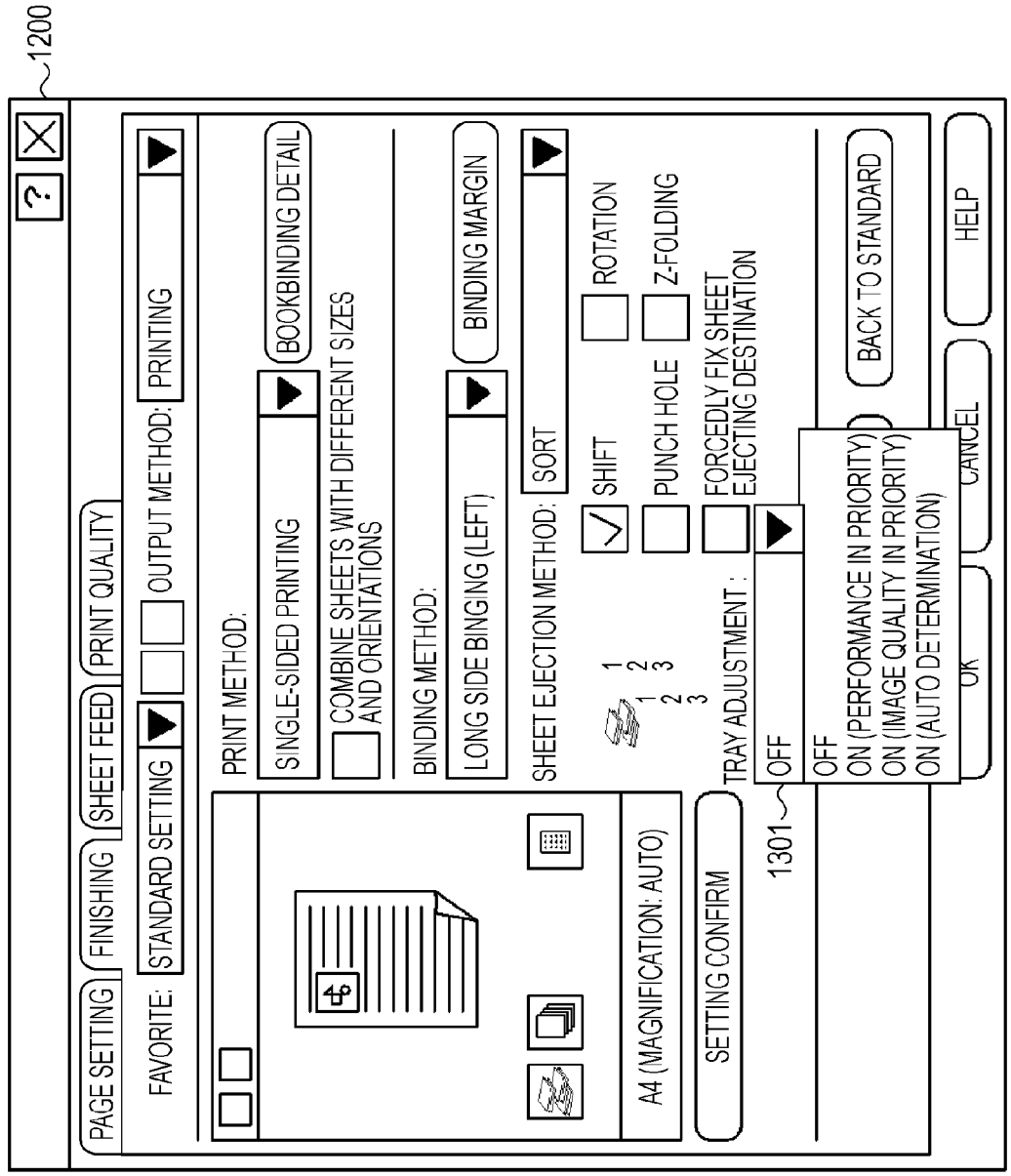
FIG. 12 illustrates a user interface example which can be displayed on a display apparatus provided to the PC shown in FIG. 1A.

FIG. 12 illustrates an example of a user interface that can be displayed on the display apparatus provided to the client PCs 301 and 302 shown in the embodiments of FIG. 1A. The present user interface may be a user interface provided by the printer driver installed into the PCs 301 and 302. The user interface may be displayed in a case where a finishing tab sheet on a property screen is selected.

In FIG. 12, with a tray adjustment specification unit 1301, OFF or ON of the execution of the tray adjustment can be specified through the operation of the user.

It is noted that the ON specification is configured to be able to specify any one or more of performance in priority, image quality in priority, and automatic determination. Herein, the performance in priority corresponds to an instruction for performing the tray adjustment on the image processing apparatus 303 side.

In other words, in the tray adjustment processing on the external controller 304 side, the RIP processing may be unavoidably generated again. Thus, the RIP processing may take time in some cases. In view of the above, if the user specifies the performance in priority, the tray adjustment may be performed on the image processing apparatus 303 side. Thus, the real time processing can be performed, and the performance may be improved.

On the other hand, the image quality in priority may correspond to an instruction for performing the tray adjustment on the external controller 304 side.

In other words, in a case where half tone simulation or the like is performed, when sheet feeding is carried out on the image processing apparatus 303, if skew correction is performed, an interference with a screen may be generated.

In view of the above, by performing the tray adjustment processing on the external controller 304 side, the interference with the screen may not be generated, and it may be possible to maintain the image quality.

Also, in the automatic determination, the adverse effects at the time of the half tone simulation execution or the like can be taken into account, and the above-described image quality in priority or the performance in priority may be automatically selected. With this configuration, in a case where the half tone simulation is performed, the external controller 304 executes the tray adjustment processing. In a case where the half tone simulation is not performed, the image processing apparatus 303 executes the tray adjustment processing.

Figure 13:
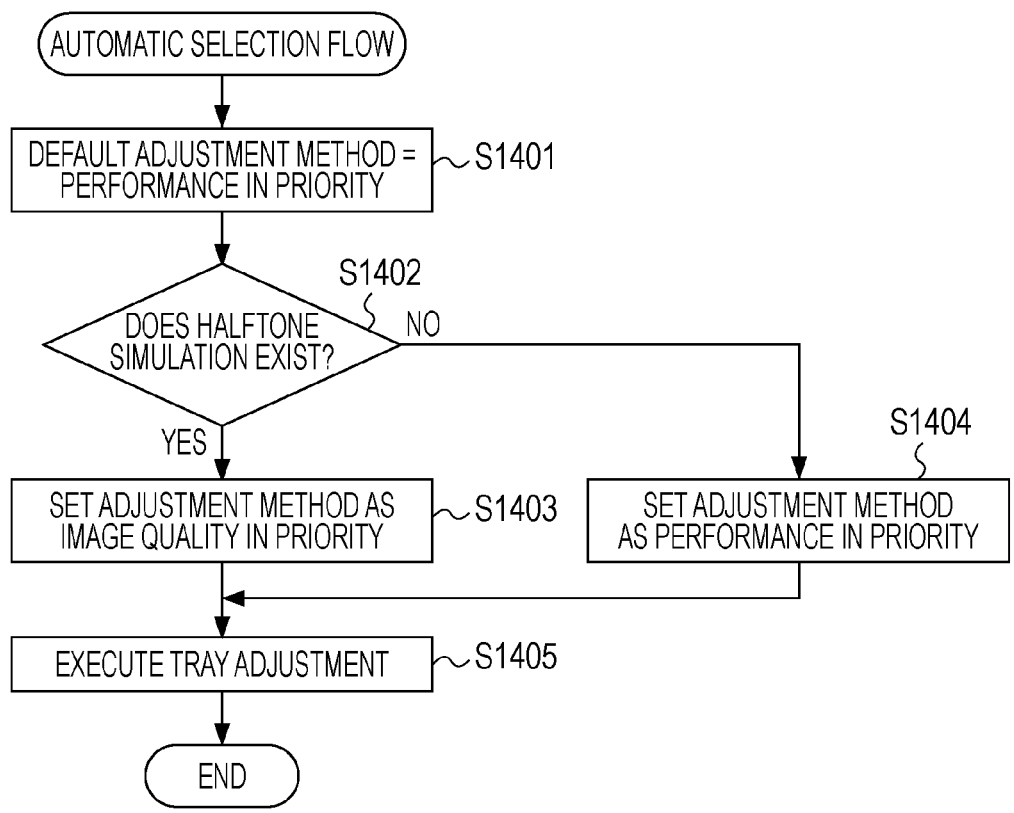
FIG. 13 is a flow chart for describing an example of a data processing procedure in an information processing apparatus according to an embodiment of the present invention.

FIG. 13 is a flow chart for an example of the data processing procedure in the information processing apparatus according to the present embodiment. The present example is an example of the tray adjustment selection processing that may be executed by the printer driver installed into the client PCs 301 and 305. It is noted that S1401 to S1405 represent the respective steps. In addition, the respective steps may be realized while the CPUs of the client PCs 301 and 305 load the printer driver onto the RAM to be executed. It is noted that the printer driver may be configured to be able to read the tray adjustment mode specified through the operation of the user via the user interface shown in FIG. 13. In addition, according to the present embodiment, processing will be described for a case where the image processing request with respect to the half tone simulation is set as a first mode and other cases are set as a second mode.

First, in S1401, the printer driver reads a default adjustment method specified through the operation of the user on the user interface shown in FIG. 13. Herein, a case where the performance in priority is specified as the default adjustment method will be described as an example.

Next, in S1402, the printer driver analyzes the print job to determine whether the half tone simulation is to be performed. Herein, in a case where the printer driver determines that the half tone simulation is to be performed (YES in step S1402), processing proceeds to S1403, where the adjustment method is set with the image quality in priority, and the processing flow advances to S1405.

On the other hand, in S1402, if the printer driver determines that the half tone simulation is not to be performed before the tray adjustment (NO in step S1402), processing proceeds to S1404, where the adjustment method is set as the performance in priority, and the flow advances to S1405. It is noted that in a case where the default is the performance in priority in S1401, the printer driver does not execute the processing for changing the adjustment method.

Next, in S1405, the printer driver specifies the tray adjustment set in S1403 and S1404 to execute the present processing.

With this configuration, in a case where the image quality in priority is set, the external controller 304 executes the RIP processing accompanying with the tray adjustment. In a case where the performance in priority is set, the image processing apparatus 303 executes the tray adjustment processing.

With this configuration, in the adjustment mode specified by the user, the tray adjustment processing can be performed on the external controller side or the output apparatus side, or the appropriate tray adjustment can be performed in accordance with the content of the print job.

Accordingly, aspects of the embodiment may provide a mechanism in which an image position shift adjustment function can be effectively utilized when image data is output from an image forming apparatus, even in a case where the specified sheet feeding unit is changed.

Hereinafter, with reference to memory maps shown in the examples of FIGS. 14 and 15, a configuration of a data processing program and/or computer-executable instructions that can be read by the image processing system according to an embodiment of the present invention will be described.

FIG. 14 is an explanatory diagram for describing an example of a memory map of a storage medium storing various data processing programs and/or computer-executable instructions that can be read by the image processing system according to the embodiment of the present invention.

FIG. 15 is an explanatory diagram for describing an example of a memory map of a storage medium storing various data processing programs and/or computer-executable instructions that can be read by the information processing apparatus according to the embodiment of the present invention.

It is noted that although not particularly shown, information for managing the program group stored in the storage medium, for example, one or more of version information, a creator, and the like, may also be stored. In addition, information depending on an OS on the program reading side or the like, for example, icons and the like for distinguishing and displaying the programs and/or computer-executable instructions may also be stored in some cases.

Furthermore, the data depending on the various programs and/or computer-executable instructions may also be managed by the above-described directory. In addition, a program for installing the various programs and/or computer-executable instructions into the computer, a program for decompressing the program and/or computer-executable instructions in a case where the program and/or computer-executable instructions to be installed is compressed, and the like may also be stored.

The functions shown in FIGS. 5, 7, 9, 11, and 13 may be realized by the host computer with the programs and/or computer-executable instructions installed from the outside. Then, in that case, the present invention can be applied in which an information group including the programs and/or computer-executable instructions is supplied to the output apparatus with a storage medium such as a one or more of a CD-ROM, a flash memory, a FD, or from an external storage medium via a network.

As described above, a storage medium on which a software program code and/or computer-executable instructions for realizing the above-described embodiments is recorded is supplied to a system or an apparatus. Then, the program code and/or computer-executable instructions stored on the storage medium is read out and executed by a computer (or a CPU or an MPU) of the system or the apparatus also of course may realize functions according to the above-described embodiments.

In this case, the program code and/or computer-executable instructions itself read out from the storage medium realizes functions according to the above-described embodiments, and the storage medium on which the program code and/or computer-executable instructions are stored may constitute an embodiment of the present invention.

Therefore, as long as the function of the program and/or computer-executable instructions is provided, any mode of the program and/or computer-executable instructions can be used such as an object code, a program executed by an interpreter, or a script data supplied to the OS.

As the storage medium for supplying the program code and/or computer-executable instructions, for example, at least one of a flexible disk, a hard disk drive, an optical disk, an opto-magnetic disk, an MO, a CD-ROM, a CD-R, a CD-RW, a magnet tape, a non-volatile memory card, a ROM, a DVD, and the like can be used.

In this case, the program code and/or computer-executable instructions themselves read out from the storage medium may realize functions according to the above-described embodiments, and the storage medium on which the program code and/or computer-executable instructions are stored may constitute an embodiment according to the present invention.

In addition, as a method of supplying the program and/or computer-executable instructions, a browser of a client computer may be used to establish a connection to a homepage of the internet. Then, the computer program and/or computer-executable instructions may be downloaded from the homepage or a compressed file including an automatic install function may be downloaded into a storage medium such as a hard disk drive. In addition, aspects of the present invention can be realized while the program code and/or computer-executable instructions according to the embodiment of the present invention is divided into a plurality of files, and the respective files are downloaded from different homepages. In other words, a WWW server, an ftp server, and the like which allow a plurality of users to download a program file and/or computer-executable instructions for instructing a computer to realize the function processing according to the embodiments of the present invention may also be within the scope of the present invention.

Also, the program and/or computer-executable instructions according to an embodiment of the present invention may be ciphered and stored on a storage medium such as a CD-ROM to be distributed to the user. The user who clears a predetermined condition may be allowed to download key information for deciphering the cipher from the homepage via the internet. Then, by utilizing the key information, the ciphered program and/or computer-executable instructions may be executed and installed into the computer to realize aspects according to the present invention.

In addition, aspects of the present invention may of course include not only a case where the program code read out by the computer is executed to realize the functions of the above-described embodiments but also a case where a part or all of the actual processes are performed by an operation system (OS) running on the computer in accordance with an instruction of the program code and/or computer-executable instructions and the process realizes functions according to the above-described embodiments.

Furthermore, aspects of the present invention may of course include a case where the above-described embodiments are realized by the following processes. That is, the program code and/or computer-executable instructions read out from the storage medium may be written in a memory that is provided to a function expansion board inserted in the computer or a function expansion unit connected to the computer. After that, in accordance with an instruction of the program code, a CPU or the like provided to the function expansion board or the function expansion unit performs a part or all of the actual processes.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions (including organic combinations of the respective embodiments).

This application claims the benefit of Japanese Application No. 2008-103216 filed Apr. 11, 2008, which is hereby incorporated by reference herein in its entirety.

What is claimed is:

1. An image processing system for performing image processing, the image processing system comprising:
an image forming apparatus; and
an external apparatus,
wherein the image forming apparatus and the external apparatus communicate with each other in order to perform the image processing,
wherein the external apparatus comprises:
a holding unit configured to hold image position adjustment values which correspond to sheet feeding units of an image forming apparatus;
a determination unit configured to determine the image position adjustment value which corresponds to a sheet feeding unit specified in a print job;
a generation unit configured to generate image data which incorporates an image position adjustment specified by the image position adjustment value determined by the determining unit, wherein the generation unit performs shift or rotation of images, formed by the image data, based on the image position adjustment value;
a reception unit configured to receive, from the image forming apparatus, sheet feeding control information that includes a specification of a different sheet feeding unit, and a request to regenerate the image data to incorporate the image position adjustment specified by the image position adjustment value which corresponds to the sheet feeding unit specified in the sheet feeding control information, and
wherein the image forming apparatus comprises:
a determination unit configured to determine a factor which prevents processing of image data, wherein the factor correlates with a sheet feeding unit specified in a print job;
a selection unit configured to select a sheet feeding unit different from the sheet feeding unit specified in the print job; and
a transmission unit configured to transmit, to the external apparatus, a request to regenerate the image data to incorporate an image position adjustment specified by an image position adjustment value which corresponds to the sheet feeding unit selected by the selection unit.

2. The system according to claim 1,
wherein the sheet feeding control information includes information on a size of a recording medium.

3. The system according to claim 1,
wherein the generation unit executes RIP processing.

4. An image processing method for an image processing system in which an image forming apparatus and an external apparatus communicate with each other in order to perform the image processing, the method comprising:
determining, by the external apparatus, an image position adjustment value which corresponds to a sheet feeding unit, of the image forming apparatus, which is specified in a print job;
generating, by the external apparatus, image data which incorporates an image position adjustment specified by the image position adjustment value determined in the determining step, wherein shift or rotation of images, formed by the image data is performed in the generation step, based on the image position adjustment value;
receiving, by the image forming apparatus, the image data generated in the generating step;
determining, by the image forming apparatus, a factor that prevents processing of the image data, the factor relating to the sheet feeding unit specified in the print job;
electing, by the image forming apparatus, a different sheet feeding unit; and
transmitting, by the image forming apparatus to the external apparatus, sheet feeding control information, which includes a specification of the sheet feeding unit selected in the selecting step, and a request to regenerate the image data so as to incorporate an image position adjustment specified by an image position adjustment value corresponding to the sheet feeding unit included in the sheet feeding control information.

5. The method according to claim 4,
wherein the sheet feeding control information includes information on a size of recording medium.

6. The method according to claim 4,
wherein RIP processing is executed in the generation step.

7. A non-transitory computer-readable storage medium storing computer executable instructions for executing an image processing method for an image processing system in which an image forming apparatus and an external apparatus communicate with each other in order to perform the image processing, the method comprising:
determining, by the external apparatus, an image position adjustment value which corresponds to a sheet feeding unit, of the image forming apparatus, which is specified in a print job;
generating, by the external apparatus, image data which incorporates an image position adjustment specified by the image position adjustment value determined in the determining step, wherein shift or rotation of images, formed by the image data is performed in the generation step, based on the image position adjustment value;
receiving, by the image forming apparatus, the image data generated in the generating step;
determining, by the image forming apparatus, a factor that prevents processing of the image data, the factor relating to the sheet feeding unit specified in the print job;
selecting, by the image forming apparatus, a different sheet feeding unit; transmitting, by the image forming apparatus to the external apparatus, sheet feeding control information, which includes a specification of the sheet feeding unit selected in the selecting step, and a request to regenerate the image data so as to incorporate an image position adjustment specified by an image position adjustment value corresponding to the sheet feeding unit included in the sheet feeding control information.

8. The non-transitory computer-readable storage medium according to claim 7,
wherein the sheet feeding control information includes information on a size of a recording medium.

9. The non-transitory computer-readable storage medium according to claim 7,
wherein RIP processing is executed in the generation step.

10. An external apparatus comprising:
a holding unit configured to hold image position adjustment values which correspond to sheet feeding units of an image forming apparatus;
a determination unit configured to determine the image position adjustment value which corresponds to a sheet feeding unit specified in a print job;
a generation unit configured to generate image data which incorporates an image position adjustment specified by the image position adjustment value determined by the determining unit, wherein the generation unit performs shift or rotation of images, formed by the image data, based on the image position adjustment value; and
a reception unit configured to receive, from the image forming apparatus, sheet feeding control information that includes a specification of a different sheet feeding unit, and a request to regenerate the image data to incorporate the image position adjustment specified by the image position adjustment value which corresponds to the sheet feeding unit specified in the sheet feeding control information.

11. A method performed by an external apparatus, the method comprising:
holding image position adjustment values which correspond to sheet feeding units of an image forming apparatus;
determining the image position adjustment value which corresponds to a sheet feeding unit specified in a print job;
generating image data which incorporates an image position adjustment specified by the image position adjustment value determined by the determining step, wherein shift or rotation of images, formed by the image data, is performed in the generation step, based on the image position adjustment value; and
receiving from the image forming apparatus, sheet feeding control information that includes a specification of a different sheet feeding unit, and a request to regenerate the image data to incorporate the image position adjustment specified by the image position adjustment value which corresponds to the sheet feeding unit specified in the sheet feeding control information.

12. A non-transitory computer-readable storage medium storing computer executable instructions for executing a method performed by an external apparatus, the method comprising:
holding image position adjustment values which correspond to sheet feeding units of an image forming apparatus;
determining the image position adjustment value which corresponds to a sheet feeding unit specified in a print job;
generating image data which incorporates an image position adjustment specified by the image position adjustment value determined by the determining step, wherein shift or rotation of images, formed by the image data, is performed in the generating step, based on the image position adjustment value; and
receiving from the image forming apparatus, sheet feeding control information that includes a specification of a different sheet feeding unit, and a request to regenerate the image data to incorporate the image position adjustment specified by the image position adjustment value which corresponds to the sheet feeding unit specified in the sheet feeding control information.

13. An image forming apparatus comprising:
a determination unit configured to determine a factor which prevents processing of image data, wherein the factor relates to a sheet feeding unit specified in a print job;
a selection unit configured to select a sheet feeding unit different from the sheet feeding unit specified in the print job; and
a transmission unit configured to transmit, to an external apparatus, a request to regenerate the image data to incorporate an image position adjustment specified by an image position adjustment value which corresponds to the sheet feeding unit selected by the selection unit, wherein shift or rotation of images, formed by the image data is performed in the regeneration, based on the image position adjustment value.

14. A method performed by an image forming apparatus, the method comprising:
determining a factor which prevents processing of image data, wherein the factor relates to a sheet feeding unit specified in a print job;
selecting a sheet feeding unit different from the sheet feeding unit specified in the print job; and
transmitting, to an external apparatus, a request to regenerate the image data to incorporate an image position adjustment specified by an image position adjustment value which corresponds to the sheet feeding unit selected in the selection step, wherein shift or rotation of images, formed by the image data, is performed in the regeneration based on the image position adjustment value.

15. A non-transitory computer-readable storage medium storing computer executable instructions for executing a method performed by an image forming apparatus, the method comprising:
determining a factor which prevents processing of image data, wherein the factor relates to a sheet feeding unit specified in a print job;
selecting a sheet feeding unit different from the sheet feeding unit specified in the print job; and
transmitting, to an external apparatus, a request to regenerate the image data to incorporate an image position adjustment specified by an image position adjustment value which corresponds to the sheet feeding unit selected in the selection step, wherein shift or rotation of images, formed by the image data, is performed in the regeneration based on the image position adjustment value.

* * * * *